United States Patent [19]

Matsushima et al.

[11] Patent Number: 4,468,486

[45] Date of Patent: Aug. 28, 1984

[54] COATED SAND AND METHOD FOR PRODUCING

[75] Inventors: Noriaki Matsushima; Yukio Saeki; Yukio Tokunaga, all of Fujieda, Japan

[73] Assignee: Sumitomo Durez Company, Ltd., Tokyo, Japan

[21] Appl. No.: 438,556

[22] Filed: Nov. 2, 1982

[30] Foreign Application Priority Data

Nov. 2, 1981 [JP] Japan .................................. 56-174512

[51] Int. Cl.³ .............................................. C08K 3/36
[52] U.S. Cl. ....................................... 523/146; 523/145; 524/394; 524/396; 524/397; 524/398; 524/399; 524/400
[58] Field of Search ................ 523/146, 145; 524/394, 524/396, 397, 398, 399, 400

[56] References Cited

U.S. PATENT DOCUMENTS

| | | | |
|---|---|---|---|
| 2,943,068 | 6/1960 | Freedman | 523/146 |
| 4,196,114 | 4/1980 | Funabiki et al. | 523/145 |
| 4,216,133 | 8/1980 | Johnson et al. | 523/145 |
| 4,252,700 | 2/1981 | Funabiki et al. | 523/145 |

*Primary Examiner*—Lewis T. Jacobs
*Attorney, Agent, or Firm*—James F. Tao; James F. Mudd

[57] ABSTRACT

A resin coated sand for shell-molding processes is provided comprising the coating of foundry sand or aggregates with a phenolic resin and a carboxylic acid salt. The carboxylic acid salt is selected from a carboxylic acid salt of an element selected from groups Ia, Ib, IIa, IIb, IIIa, IVa, Va, VIb, VIIa, VIIb or VIII of the Periodic Table of Elements. The proportion of carboxylic acid salt to phenolic resin is from 0.5 to 40 parts carboxylic acid salt to 100 parts phenolic resin. This resin coated sand produces shell-molds having excellent properties for casting, and allows the molded article to be removed in an easy and efficient manner.

40 Claims, 1 Drawing Figure

COATED SAND AND METHOD FOR PRODUCING

BACKGROUND OF THE INVENTION

The present invention relates to an improved resin coated sand to be used in a shell-molding process. In conventional sand-molding operations, a mixture of sand coated with binder is placed in the mold, and the heat of the processing steps causes reactions to occur between the binder components to improve the pressed strength of the sand and retain the configuration of the part to be cast. After introduction of the molten metal into the cavity, the heat of the metal, during the cooling cycle is transferred to the sand-binder mixture causing the binder to be destroyed to a degree that allows the sand to be removed from the cast metal in an efficient manner.

In the automobile industry, the trend of manufacturers has led to the replacement of iron and steel castings with lighter weight metals such as aluminum, magnesium and their alloys. These castings are produced by sand-molding processes, but occur at lower temperatures than iron castings. The use of conventional binders, at these lower temperatures, have created problems in the removal of the sand particles from the castings due to the failure of the binder to be decomposed.

In the case of iron casting, the stock temperature of shell-mold reaches 800°–1000° C. at pouring, and the strength of shell-mold is naturally reduced after casting because almost all the phenolic resin binder is subjected to thermal degradation by the intense heat at pouring. Accordingly it is easy to remove the mold-core from molded articles in the form of sand grains after casting.

For metals having a lower melting temperature, such as aluminum and magnesium, the stock temperature of shell-mold at pouring is rather low, approximately 300°–400° C. This results in an incomplete thermal degradation of the phenolic resin binder. Since conventional shell-molds have retained superfluous strength after casting for this reason, there have been extreme difficulties particularly for complicated mold structures, in removing the core efficiently from molded articles. In these cases, flogging is required so as to crush the molds even after time-consuming calcination thereof in a furnace to remove the occluded core therefrom. Flogging is a term used to indicate a tapping or impact force applied to the castings to remove the particulate sand particles leaving a clean cast structure.

After much investigation to improve the shake-out property of shell-molds after casting metals having a lower melting temperature, such as aluminum, the inventors have found that the shake-out property of cast shell molds is greatly improved by using a resin-coated sand produced by coating foundry sand with a phenolic resin in the presence of carboxylic acid salts of elements selected from groups Ia, Ib, IIa, IIb, IIIa, IVb, Va, VIb, VIIa, VIIb or VIII of the Periodic Table of elements.

It is an object of this invention to provide a resin binder for shell-molding operations that will produce a coated foundry sand possessing sufficient strength for casting molten metals, such as aluminum, magnesium and their alloys, and upon cooling of the casting allow easy removal of the sand from the cast object.

It is an additional object of this invention to provide a binder for foundry sand or aggregates that will be sufficiently degraded or decomposed, upon completion of the molding cycle, to allow easy reuse of the sand.

SUMMARY OF THE INVENTION

This invention relates to an improved binder for resin-coated sand for use in shell-molding operations and a method for preparation of resin coated sand.

The binder is composed of a phenolic resin incorporating a carboxylic acid salts of elements selected from groups Ia, Ib, IIa, IIb, IIIa, IVb, Va, VIb, VIIa, VIIb or VIII of the Periodic Table of Elements. The proportion of carboxylic acid salt to phenolic resin is from 0.5 to 40 parts of the acid salt to 100 parts of the phenolic resin. The phenolic resin may be of the novolac type, the resole type, or mixtures of the two types.

DETAILED DESCRIPTION OF THE INVENTION

Figure 1:
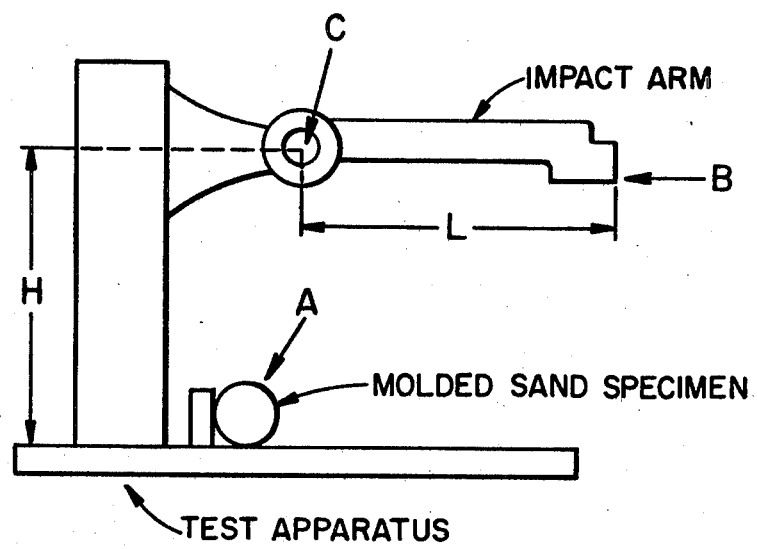
FIG. 1 is a side view of the test device used to determine the shake-out property of the cured resin coated sand.

After much investigation to improve the shake-out property of shell-molds after casting metals having a lower melting temperature, e.g. aluminum, the inventors hereof have found that the shake-out property of cast shell-molds is improved by using coated sand produced by coating foundry sand with a phenolic resin in the presence of carboxylic acid salts of elements selected from those belonging to such groups in Periodic Table of Elements as Ia, Ib, IIb, IIIa, IVb, Va, VIb, VIIa, VIIb and VIII.

In order to improve the shake-out property after casting metals having a low melting temperature, the chemical crosslinking structure of cured phenolic binders must thermally be degraded and disintegrated at a relatively low temperature range of 300° to 400° C.

The thermal decomposition of phenolic resins is thought to be a thermal oxidation process whether exposed to either an oxidative or an inert atmosphere. In an inert atmosphere, it is thought that much of the oxygen contained therein contributes to the initiation of oxidation. It is further thought that both the methylene and methine groups change to hydroperoxides due to said thermal oxidation, and finally yield carboxylic acids through decomposition of dihydrobenzophenone. Accordingly, adding a compound, having a catalytic effect of reducing the activation energy of oxidation and/or thermal decomposition of methylene and methine groups, in phenolic resins appears to be an effective method for causing a thermal decomposition of said phenolic resins in a lower temperature range of 300° to 400° C.

The inventors hereof have found that organic carboxylic acid salts improve the shake-out property of shell-molds after casting metals and that they do not lower the initial strength of shell-molds.

Said carboxylic acid salts according to the present invention are organic carboxylic acid salts having elements selected from those such groups in Periodic Table of Elements as Ia, Ib, IIa, IIb, IIIa, IVa, Va, VIb, VIIa, VIIb, and VIII, such as formates, acetates, butyrates, benzoates, salicylates, fumarates, oxalates, acrylates, polyacrylates, methacrylates, polymethacrylates, adipates, lactates, citrates, and succinates. Preferably among formates; sodium formate and nickel formate; among acetates: cobalt acetate, zinc acetate, lead acetate, sodium acetate, potassium acetate, copper acetate and barium acetate; among oxalates: sodium oxalate, potassium oxalate, and oxalic chloride. One or more thereof are usable in the present invention.

The proportion of organic carboxylic acid salts according to the present invention in a phenolic resin is most preferably 0.5 to 40 parts by weight of the acid salt to 100 parts by weight of the phenolic resin. When the proportion is less than 0.5 parts by weight, it is difficult to obtain an excellent shake-out property, and when the ratio is more than 40 parts by weight, it impairs the initial strength of shell-molds and the curing behavior of resin coated sand.

The proper time for incorporating carboxylic acid salts during the process of preparing phenolic resin is optional: at the beginning, during or after reacting phenols with formaldehyde. Or alternately, after preparing said solid phenolic resin, carboxylic acid salts are incorporated thereinto by mix-grinding or melt-mixing with a kneading machine such as an extruder. It is also possible to incorporate the carboxylic acid salts during the coated sand production steps. The proper time for incorporating carboxylic acid salts thereinto is optional: prior to, during or after adding the phenolic resin thereinto. Carboxylic acid salts are incorporated either as they are, or dissolved or dispersed in a medium. Any incorporating method improves the shake-out property of shell-molds obtained from coated sand thus produced.

The phenolic resins used in the present invention are any of the novolac, the resole type or a mixture thereof. Phenols for preparing said phenolic resins are phenol, cresol, xylenol, etc., however, they are usable in the presence of resorcin, cathecol, hydroquinone, aniline, urea, melamine, cashew nut shell oil, etc. Formaldehyde for preparing said phenolic resins is selected from formalin, paraformaldehyde, trioxane, etc. Catalysts for the reaction of phenol and formaldehyde are acidic substances generally such as oxalic, hydrochloric and sulfuric acid, and organic metal salts for novolac type resin preparation. Basic substances generally selected from such as ammonia, triethylamine, sodium hydroxide, and barium hydroxide, and are catalysts for resole type resin preparation. Lubricants are usable according to the present invention, which are ordinary ones, however, preferable are ethylene bis-stearic amide, methylene bis-stearic amide, oxy-stearic amide stearic amide and methylol stearic amide. Lubricant-containing phenolic resins can be obtained by adding said lubricant to phenolic resins at any stage of their preparation; prior to, during or after the reaction.

Methods for producing resin coated sand in the present invention may be any of the commercial hot-coating, semi-hot-coating, cold-coating, and power-solvent coating, however, hot-coating is preferably recommended for the present invention.

The inventors hereof will explain the present invention by the following nonlimitative Examples and Comparatice Examples, wherein "parts" and "percent" indicate "parts by weight" and "percent by weight", respectively.

PREPARATION EXAMPLES 1, 2 AND 3

To each of three kettles with a reflux cooler and a stirrer, 1000 parts of phenol, 650 parts of 37% formalin, and 10 parts of oxalic acid were charged. The temperature of each kettle was gradually elevated, and upon reaching 96° C., reflux continued for 120 minutes. 10 parts of methylene bis-stearic amide and 100 parts each of cobalt acetate, nickel formate, and potassium oxalate were added respectively to each of these kettles. After mixing, the reaction mixtures were dehydrated under vacuum and dumped to obtain 1070 parts of respective novolac type phenolic resins. Proportion of carboxylic acid salts incorporated into 100 parts of said novolac type phenolic resins was 10 parts, respectively.

PREPARATION EXAMPLES 4, 5 AND 6

To each of three kettles with a reflux cooler and a stirrer, 1000 parts of phenol, 1795 parts of 37% formalin, 160 parts of 28% aqueous ammonia, and 60 parts of 50% sodium hydroxide solution were charged. The temperature of each kettle was gradually elevated, and upon reaching 96° C., reflux continued for 30 minutes. 40 parts of methylene bis-stearic amide and 220 parts each of cobalt acetate, nickel formate, and potassium oxalate were added respectively to each of three kettles. After mixing, the reaction mixtures were dehydrated under vacuum, dumped, and rapidly cooled to obtain 1320 parts of the respective resole type phenolic resins. Proportion of carboxylic acid salts incorporated into 100 parts of said resole type phenolic resins was 20 parts, respectively.

PREPARATION EXAMPLES 7, 8 AND 9

To each of three kettles with a reflux cooler and a stirrer, 1000 parts of phenol, 650 parts of 37% formalin, and 10 parts of oxalic acid were charged. The temperature of each kettle was gradually elevated, and upon reaching 96° C., reflux continued for 120 minutes. 10 parts of methylene bis-stearic amide, and 0, 2 and 485 parts of cobalt acetate were added to each of three kettles. After mixing, the reaction mixtures were dehydrated under vacuum and dumped to obtain 970, 972 and 1455 parts of novolac type phenolic resins, respectively. Proportions of carboxylic acid salts incorporated into 1000 parts of said each novoloac type phenolic resin were 0, 0.2, and 50 parts, respectively.

PREPARATION EXAMPLE 10

To a kettle with a reflux cooler and a stirrer, 1000 parts of phenol, 1795 parts of 37% formalin, 160 parts of 28% aqueous ammonia, and 60 parts of 50% sodium hydroxide solution were added. The temperature of the mixture was gradually elevated. When the temperature reached 96° C., reflux continued for 30 minutes. 40 parts of ethylene bis-stearic amide was added. After dehydration under vacuum, it was dumped from the kettle, and cooled rapidly, to obtain 1100 parts of a resole type phenolic resin.

EXAMPLE 1

Preheated at 130° to 140° C., 7000 parts of Sanei No. 6 silica sand were charged into a whirl-mixer. After adding 140 parts of novolac type phenolic resin obtained according to Preparation Example 1 thereto, it was mixed for 40 seconds, and 21 parts of hexamethylene tetramine dissolved in 105 parts of water were added thereto. The mixture was further mixed until it crumbled. 7 parts of calcium stearate were added thereto, and after 30 seconds' mixing, discharged and aerated to obtain coated sand.

EXAMPLE 2

Except for using novolac type phenolic resin obtained according to Preparation Example 2, coated sand was obtained by the same method and conditions of Example 1.

EXAMPLE 3

Except for using novolac type phenolic resin obtained according to Preparation Example 3, coated sand was obtained by the same method and conditions of Example 1.

EXAMPLE 4

Preheated at 130° to 140° C., 7000 parts of Sanei No. 6 silica sand were charged into a whirl-mixer. After adding 140 parts of resole type phenolic resin obtained according to Preparation Example 4 thereto, it was mixed for 40 seconds, and 150 parts of cooling water was added thereto. The mixture was further mixed well until it crumbled. 7 parts of calcium stearate were added thereto, mixed for 30 seconds, discharged and aerated to obtain coated sand.

EXAMPLE 5

Except for using resole type phenolic resin obtained according to Preparation Example 5, coated sand was obtained by the same method and conditions of Example 4.

EXAMPLE 6

Except for using resole type phenolic resin obtained according to Preparation Example 6, coated sand was obtained by the same method and conditions of Example 4.

EXAMPLE 7

Preheated at 130° to 140° C., 7000 parts of Sanei No. 6 silica sand were charged into a whirl-mixer and 130 parts of novolac type phenolic resin obtained according to Preparation Example 7 were added thereto. Followed by 20 second's mixing, 13 parts of cobalt acetate was added thereto. After mixing for 20 seconds, 21 parts of hexamethylene tetramine dissolved in 105 parts of water was added. The mixture was further mixed until it crumbled. 7 parts of calcium stearate was added thereto, followed by 30 seconds mixing. The mixture was discharged and aerated to obtain coated sand.

EXAMPLE 8

Except for using potassium oxalate as the carboxylic acid salt, coated sand was obtained by the same method and conditions of Example 7.

EXAMPLE 9

Preheated at 130° to 140° C., 7000 parts of Sanei No. 6 silica sand were charged into a whirl-mixer. After adding 13 parts of cobalt acetate thereto, it was mixed for 20 seconds. Successively 78 parts of novolac type phenolic resin according to Preparation Example 7 and 52 parts of resole type phenolic resin according to Preparation Example 10 were added, and mixed for 20 seconds. Then, 13 parts of hexamethylene tetramine dissolved in 63 parts by weight of water were added thereto. The mixture was mixed until it crumbled. After 7 parts of calcium stearate were added thereto; mixed for 30 seconds. The mixture was discharged and aerated to obtain coated sand.

EXAMPLE 10

Except for using potassium oxalate as the carboxylic acid salt, coated sand was obtained by the same method and conditions of Example 9.

COMPARATIVE EXAMPLE 1

Preheated at 130 at 140° C., 7000 parts of Sanei No. 6 silica sand were charged into a whirl-mixer. After adding 140 parts of novolac type phenolic resin obtained according to Preparation Example 7 thereto, it was mixed for 40 seconds, and 21 parts of hexamethylene tetramine dissolved in 105 parts of water were added thereto. The mixture was mixed well until it crumbled. Successively 7 parts of calcium stearate were added thereto, mixed for 30 seconds. The mixture was discharged and aerated to obtain coated sand.

COMPARATIVE EXAMPLE 2

Except for using novolac type phenolic resin obtained according to Preparation Example 8, coated sand was obtained by the same method and conditions of Comparative Example 1.

COMPARATIVE EXAMPLE 3

Except for using novolac type phenolic resin obtained according to Preparation Example 9, coated sand was obtained by the same method and conditions of Comparative Example 1.

COMPARATIVE EXAMPLE 4

Preheated at 130° to 140° C., 7000 parts of Sanei No. 6 silica sand were charged into a whirl-mixer. After adding 140 parts of resole type phenolic resin obtained according to Comparative Example 4, it was mixed for 40 seconds, and 105 parts of cooling water were added thereto. The mixture was mixed well until it crumbled. 7 parts of calcium stearate were added thereto, mixed for 30 seconds. The mixture was discharged and aerated to obtain coated sand.

Table I indicates the characteristics of various types of coated sand obtained according to Examples 1 to 10, as well as the shake-out properties of the shell-molds obtained therefrom.

Table II indicates the characteristics of various types of coated sand obtained according to Comparative Examples 1–4, as well as the shake-out properties of the shell-molds obtained therefrom.

Test Methods

Bending strength: according to JACT Method SM-1
Stick point: according to JACT Method C-1
Tensile strength under elevated temperature: according to JACT Method SM-10
Shake-out property:
  Preparation of specimen: Coated sand is fed into an iron pipe of 29 mm in diameter and 150 mm in length. After 30 minutes baking, it is covered with aluminum foil and further heated for 3 hours at 370° C. After cooling, the sand molded pipe is taken out.
  Test method: The specimen is struck by the impact arm of the apparatus illustrated in FIG. 1. Crumbled sand is removed from the pipe after each flogging. Weighing the residual molded sand of flogging required.
  Test apparatus: In FIG. 1, A is a molded sand specimen and B is the arm which revolves around pivot C 30 cm (H) above A. Said arm is at first set horizontally, and then allowed to drop so as to flog said specimen.

TABLE I

|  | 1 | 2 | 3 | 4 | 5 | 6 | 7 | 8 | 9 | 10 |
|---|---|---|---|---|---|---|---|---|---|---|
| Preparation Example | 1 | 2 | 3 | 4 | 5 | 6 | 7 | 7 | 7 + 10 | 7 + 10 |
| Carboxylic acid salts incorporated | A | B | C | A | B | C | A | C | A | C |
| Incorporating proportion of carboxylic acid salts in 100 parts of phenolic resin (parts) | 10 | 10 | 10 | 20 | 20 | 20 | 10 | 10 | 10 | 10 |
| Coated sand Stick point (°C.) | 102 | 102 | 102 | 100 | 101 | 100 | 102 | 102 | 101 | 100 |
| Shell-mold Bending strength (Kg/cm$^2$) | 30.0 | 29.7 | 28.9 | 27.2 | 26.5 | 26.0 | 29.8 | 29.6 | 28.5 | 27.3 |
| Tensile strength under heat (Kg/cm$^2$) at 250° C. 30 sec | 2.6 | 2.6 | 2.5 | 1.6 | 1.5 | 1.4 | 2.6 | 2.5 | 2.1 | 2.0 |
| 45 sec | 4.9 | 4.8 | 4.8 | 3.0 | 3.0 | 2.9 | 4.9 | 4.8 | 4.0 | 4.1 |
| 60 sec | 8.0 | 7.9 | 7.9 | 6.5 | 6.3 | 6.2 | 8.0 | 7.8 | 7.6 | 7.4 |
| Shake-out property (times) | 13 | 13 | 13 | 9 | 9 | 8 | 12 | 13 | 10 | 11 |

Note:
Carboxylic acid salts incorporated
A: Cobalt acetate
B: Nickel formate
C: Potassium Oxalate

TABLE II

|  | Comparative Example | | | |
|---|---|---|---|---|
|  | 1 | 2 | 3 | 4 |
| Preparation Example | 7 | 8 | 9 | 10 |
| Carboxylic acid salts incorporated | — | A | A | — |
| Incorporating proportion of carboxylic acid salts in 100 parts of phenolic resin (parts) | 0 | 0.2 | 50 | 0 |
| Coated sand Stick point (°C.) | 102 | 102 | 104 | 98 |
| Shell-mold Bending strength (Kg/cm$^2$) | 31.0 | 30.5 | 16.3 | 29.0 |
| Tensile strength under heat (Kg/cm$^2$) at 250° C. 30 sec | 2.5 | 2.4 | 0.9 | 1.9 |
| 45 sec | 5.1 | 4.9 | 2.3 | 3.1 |
| 60 sec | 8.2 | 8.2 | 2.7 | 6.6 |
| Shake-out property (times) | 31 | 31 | 4 | 27 |

Note:
Carboxylic acid salts incorporated
A: Cobalt acetate

What is claimed is:

1. Resin coated sand for shell-molding operations comprising foundry aggregates coated with a phenolic resin and a carboxylic acid salt of an element selected from groups Ia, Ib, IIa, IIb, IIIa, IVa, Va, VIb, VIIb, or VIII of the Periodic Table of Elements, wherein the carboxylic acid salt is selected from formate, acetate, butyrate, benzoate, salicylate, fumarate, oxalate, acrylate, polyacrylate, methacrylate, polymethacrylate, adipate, lactate, citrate or succinate, and the ratio of carboxylic acid salt to phenolic resin is from about 0.5 to about 40 parts by weight to 100 parts phenolic resin.

2. Resin coated sand according to claim 1, wherein said acetate salt is selected from cobalt acetate, manganese acetate, magnesium acetate, calcium acetate, zinc acetate, lead acetate, sodium acetate, potassium acetate, copper acetate or barium acetate.

3. Resin coated sand according to claim 2, wherein said phenolic resin is a novolac phenolic resin.

4. Resin coated sand according to claim 2, wherein said phenolic resin is a resole phenolic resin.

5. Resin coated sand according to claim 2, wherein said phenolic resin is a mixture of the novolac and the resole of phenolic resins.

6. Resin coated sand according to claim 1, wherein said formate salt is selected from sodium formate or nickel formate.

7. Resin coated sand according to claim 6, wherein said phenolic resin is a novolac phenolic resin.

8. Resin coated sand according to claim 6, wherein said phenolic resin is a resole phenolic resin.

9. Resin coated sand according to claim 6, wherein said phenolic resin is a mixture of the novolac and the resole of phenolic resins.

10. Resin coated sand according to claim 1, wherein said oxalate salt is selected from sodium oxalate, potassium oxalate or oxalic chloride.

11. Resin coated sand according to claim 10, wherein said phenolic resin is a novolac phenolic resin.

12. Resin coated sand according to claim 10, wherein said phenolic resin is a resole phenolic resin.

13. Resin coated sand according to claim 10, wherein said phenolic resin is a mixture of the novolac and the resole of phenolic resins.

14. Resin coated sand according to claim 1, wherein said phenolic resin is a novolac phenolic resin.

15. Resin coated sand according to claim 14, further comprising a lubricant.

16. Resin coated sand according to claim 1, wherein said phenolic resin is a resole phenolic resin.

17. Resin coated sand according to claim 16, further comprising a lubricant.

18. Resin coated sand according to claim 1, wherein said phenolic resin is a mixture of the novolac and the resole of phenolic resins.

19. Resin coated sand according to claim 18, further comprising a lubricant.

20. Resin coated sand according to claim 1, further comprising a lubricant.

21. A method for producing resin coated sand for shell-molding operations having improved shake-out properties comprising coating foundry aggregates with phenolic resin and a carboxylic acid salt of an element selected from groups Ia, Ib, IIa, IIb, IIIa, IVa, Va, VIb, VIIa, VIIb or VIII of the Periodic Table of Elements, wherein said carboxylic acid is selected from formate, acetate, butyrate, benzoate, salicylate, fumarate, oxalate, acrylate, polyacrylate, methacrylate, polymethacrylate, adipate, lactate, citrate or succinate, and the ratio of carboxylic acid salt to phenolic resin is from about 0.5 to about 40 parts carboxylic acid salt to 100 parts phenolic resin.

22. A method for producing resin coated sand according to claim 21, wherein said formate is selected from sodium formate and nickel formate.

23. A method for preparing resin coated sand according to claim 22, wherein the phenolic resin is a novolac.

24. A method for preparing resin coated sand according to claim 22, wherein the phenolic resin is a resole phenolic resin.

25. A method for preparing resin coated sand according to claim 22, wherein the phenolic resin is a mixture of resole and novolac of phenolic resins.

26. A method for preparing resin coated sand according to claim 22, wherein said phenolic resin contains a lubricant.

27. A method for producing resin coated sand according to claim 21, wherein said acetate is selected from cobald acetate, manganese acetate, nickel acetate, magnesium acetate, calcium acetate, zinc acetate, lead acetate, sodium acetate, potassium acetate, copper acetate and barium acetate.

28. A method for preparing resin coated sand according to claim 27, wherein the phenolic resin is a novolac.

29. A method for preparing resin coated sand according to claim 27, wherein the phenolic resin is a resole phenolic resin.

30. A method for preparing resin coated sand according to claim 27, wherein the phenolic resin is a mixture of resole and novolac of phenolic resins.

31. A method for preparing resin coated sand according to claim 27, wherein said phenolic resin contains a lubricant.

32. A method for producing resin coated sand according to claim 21, wherein said oxalate is selected from sodium oxalate, potassium oxalate and oxalic chloride.

33. A method for preparing resin coated sand according to claim 32, wherein the phenolic resin is a novolac.

34. A method for preparing resin coated sand according to claim 32, wherein the phenolic resin is a resole phenolic resin.

35. A method for preparing resin coated sand according to claim 32, wherein the phenolic resin is a mixture of resole and novolac of phenolic resins.

36. A method for preparing resin coated sand according to claim 32, wherein said phenolic resin contains a lubricant.

37. A method for preparing resin coated sand according to claim 21, wherein the phenolic resin is a novolac phenolic resin.

38. A method for preparing resin coated sand according to claim 21, wherein the phenolic resin is a resole phenolic resin.

39. A method for preparing resin coated sand according to claim 21, wherein the phenolic resin is a mixture of resole and novolac of phenolic resins.

40. A method for preparing resin coated sand according to claim 21, wherein said phenolic resin contains a lubricant.

* * * * *